United States Patent [19]
Levitan et al.

[11] Patent Number: 5,520,772
[45] Date of Patent: May 28, 1996

[54] LAMINATING MACHINE WITH TWO-STAGE HEATING

[75] Inventors: David M. Levitan, Wheeling; Kenneth G. Meyer, St. Charles; Rory S. Olson, Harvard, all of Ill.

[73] Assignee: Technologies Development, Inc., Harvard, Ill.

[21] Appl. No.: 284,750

[22] Filed: Aug. 2, 1994

Related U.S. Application Data

[63] Continuation of Ser. No. 114,900, Sep. 2, 1993, abandoned.

[51] Int. Cl.$^6$ ........................................ B32B 31/00
[52] U.S. Cl. ........................ 156/358; 156/87; 156/320; 156/322; 156/359; 100/93 RP
[58] Field of Search ........................ 156/87, 320, 322, 156/358, 359, 583.1; 100/93 P, 93 RP

[56] References Cited

U.S. PATENT DOCUMENTS

| | | | |
|---|---|---|---|
| 3,660,198 | 5/1972 | Thiel | 156/87 |
| 3,772,128 | 11/1973 | Kahn et al. | 156/555 |
| 3,912,542 | 10/1975 | Hirano et al. | 156/312 X |
| 4,311,549 | 1/1982 | Vercillo | 156/359 X |
| 4,445,953 | 5/1984 | Hawk | 156/102 |
| 4,450,024 | 5/1984 | Haghiri-Tehrani et al. | 156/322 X |
| 4,695,335 | 9/1987 | Lyall | 156/359 X |
| 4,913,951 | 4/1990 | Pitolaj | 156/87 X |
| 5,071,504 | 12/1991 | Singer | 156/583.1 X |

*Primary Examiner*—David A. Simmons
*Assistant Examiner*—Paul M. Rivard
*Attorney, Agent, or Firm*—Dorn, McEachran, Jambor & Keating

[57] ABSTRACT

A laminating machine for laminating layers of plastic film about an insert has cold feed rollers, a preheater and heated expeller rollers. The workpiece to be laminated is fed to the preheater by the feed rollers and is heated to a temperature just below the melting point of the adhesive on the plastic film. The heated workpiece is then fed to the hot expeller rollers which apply heat and pressure to finish melting the adhesive and squeeze any air bubbles out of the workpiece. Temperature controls assure that no melting and thus, no pre-lamination occurs at the preheater. The preheating step results in a laminating machine with high throughput of high quality laminations, even with inserts impervious to air.

2 Claims, 4 Drawing Sheets

LAMINATING MACHINE WITH TWO-STAGE HEATING

This is a continuation of application Ser. No. 08/114,900, filed on Sep. 2, 1993, now abandoned.

BACKGROUND OF THE INVENTION

This invention relates to plastic film laminators of the type used for applying protective coverings to drivers licenses, identification cards, menus, photographs and other products formed of laminated plastic film. Such products typically comprise a paper card or the like placed between layers of plastic film such as polyethylene-coated Mylar. The plastic layers extend somewhat beyond the edges of the card. When the edges of the plastic layers are sealed by heating, a protective pocket or pouch is formed around the card.

Generally, there are two main types of laminating machines. In smaller machines, heating of the plastic film to aid in lamination is accomplished by means of flat platens. Expeller rollers downstream of the platens compress the heated film. An early example of a flat platen laminator is Elliott U.S. Pat. No. 2,927,620. A more recent example is Levitan U.S. Pat. No. 3,770,550. The other basic type of laminating machine uses heated rollers in the lamination process. These are usually larger machines. An example is Eisner U.S. Pat. No. 3,027,285.

An important application for pouch laminating machines is laminating substrates which are impervious to air. Such substrates include glossy photographs and inserts constructed of die-cut polymer sheets. A major drawback of current flat platen laminating machines is their tendency to entrap air bubbles or moisture between the laminate film and impervious substrates. This detracts from the picture quality, and can render data encoding schemes such as magnetic stripes and bar codes unreliable.

The cause of entrapment in flat platen laminators is as follows. The flat, heated platens are in contact with the film to heat and melt the adhesive. Often the platens are in pressure contact with the laminate workpiece, and the pressure can cause pre-lamination of the plastic and adhesive to the substrate prior to reaching the downstream expeller rollers. Once pre-lamination has occurred in the platens, the cold expeller rollers cannot undo the pre-lamination and the bubbles are trapped.

Heated roller machines are not as prone to entrapment as flat platen machines but they suffer from productivity problems. These machines use roller heat alone to melt the adhesive layer. Because the roller nip is relatively narrow and the dwell time is very short, the feed rate of the workpiece must be slow or the rollers must operate at an extremely high temperature. Otherwise insufficient heat is transferred to the workpiece to effect complete lamination. It is preferable to avoid the slow feed rates and high operating temperatures of heated roller laminators, and also prevent the entrapment problems of heated platen laminators. The present invention makes this possible.

SUMMARY OF THE INVENTION

This invention concerns a pouch laminating machine which maximizes throughput and quality while minimizing entrapped air bubbles in non-porous substrates. The laminating machine of the present invention uses a preheater located upstream of heated expeller rollers. The preheater heats the film to a temperature just below that needed to melt the adhesive. Then, with the workpiece's thermal system on the verge of melting the adhesive, the workpiece is fed to heated expeller rollers which can impart the small amount of additional heat needed for lamination in a limited dwell time.

The preheater is preferably a pair of heated flat platens located downstream of cold feed rollers. The feed rollers direct the workpiece into the flat platens where they are heated close to but below the adhesive's melting point. From the platens the workpiece is fed to hot expeller rollers which raise the workpiece temperature to the adhesive melting point. The expeller rollers squeeze any air bubbles out of the workpiece and seal the pouch.

DETAILED DESCRIPTION OF THE INVENTION

Figure 1:
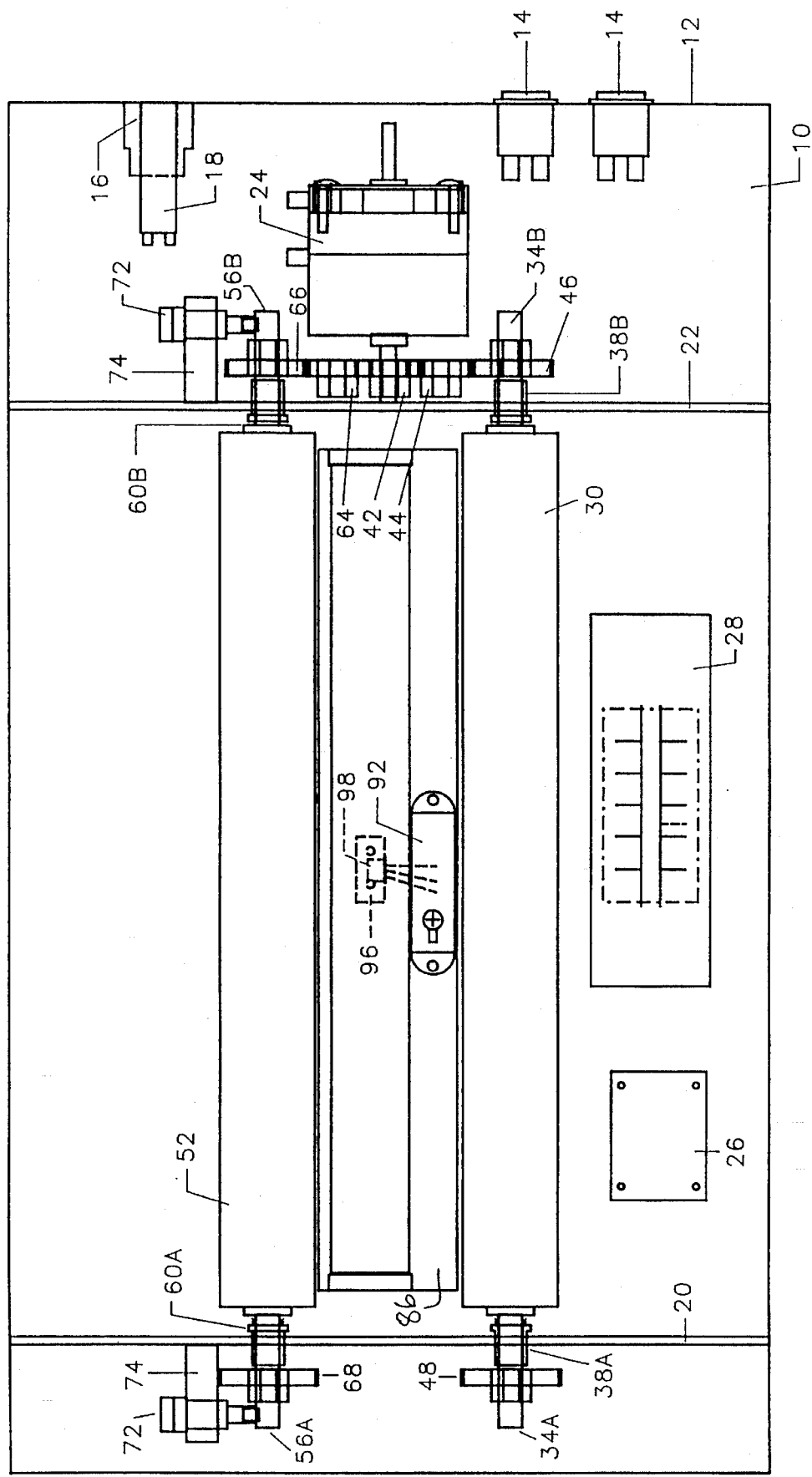
FIG. 1 is a diagrammatic top plan view of the laminator according to the present invention.
Figure 2:
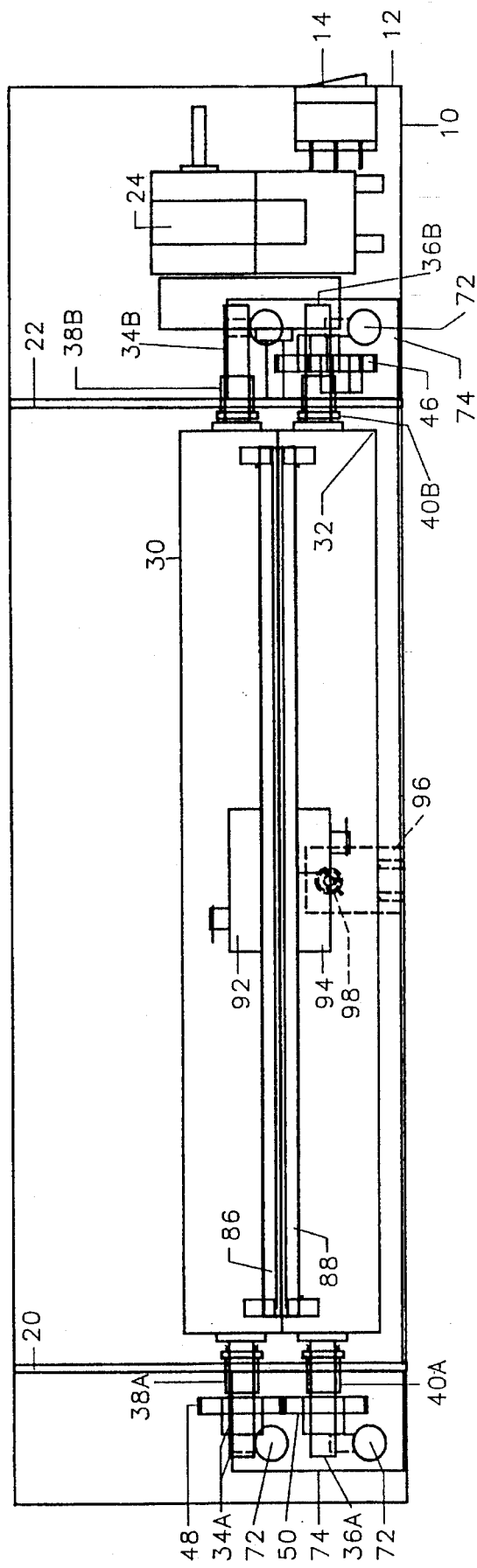
FIG. 2 is a front elevation view of the laminator.
Figure 3:
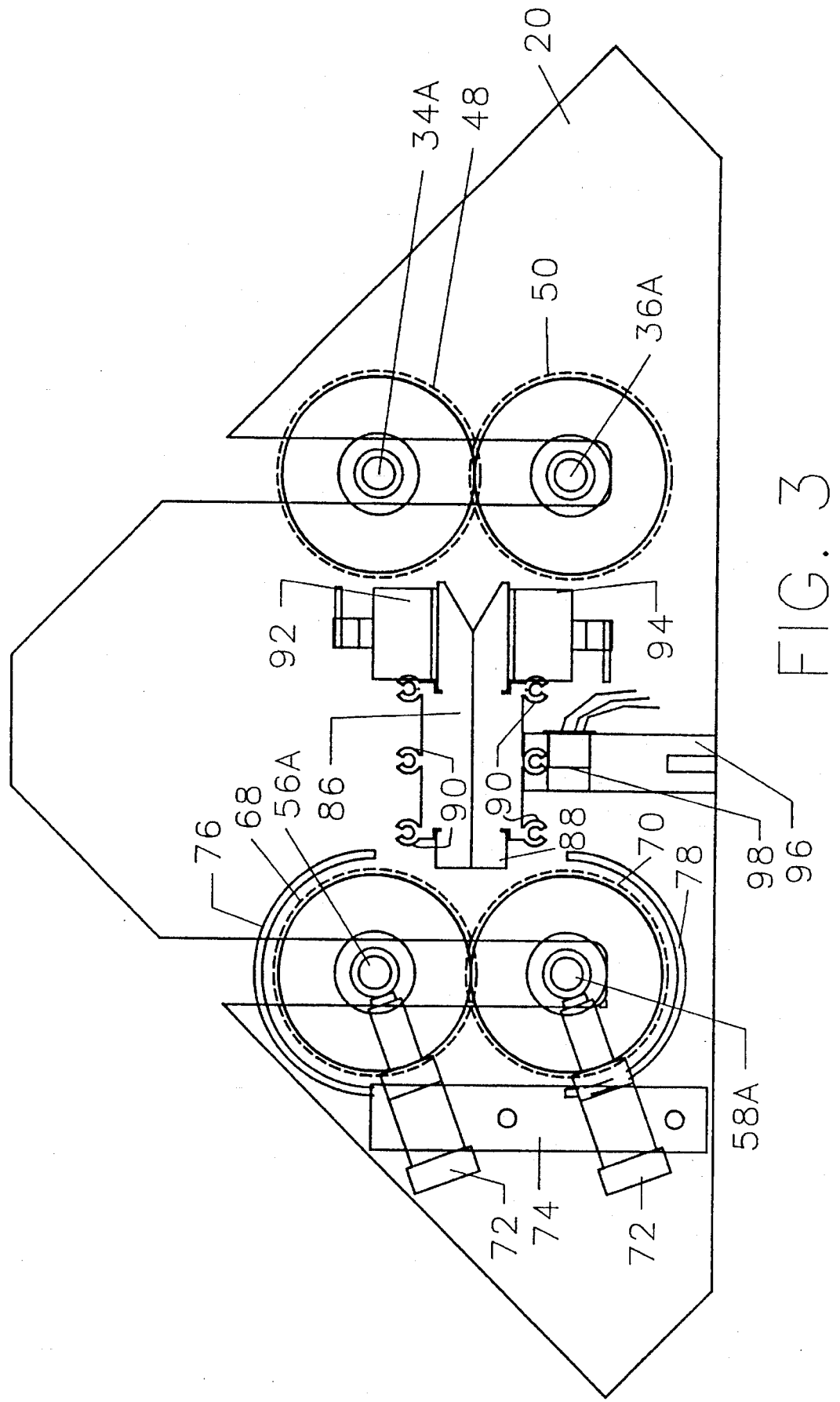
FIG. 3 is a schematic side elevation view, looking from the left side of FIG. 1.
Figure 4:
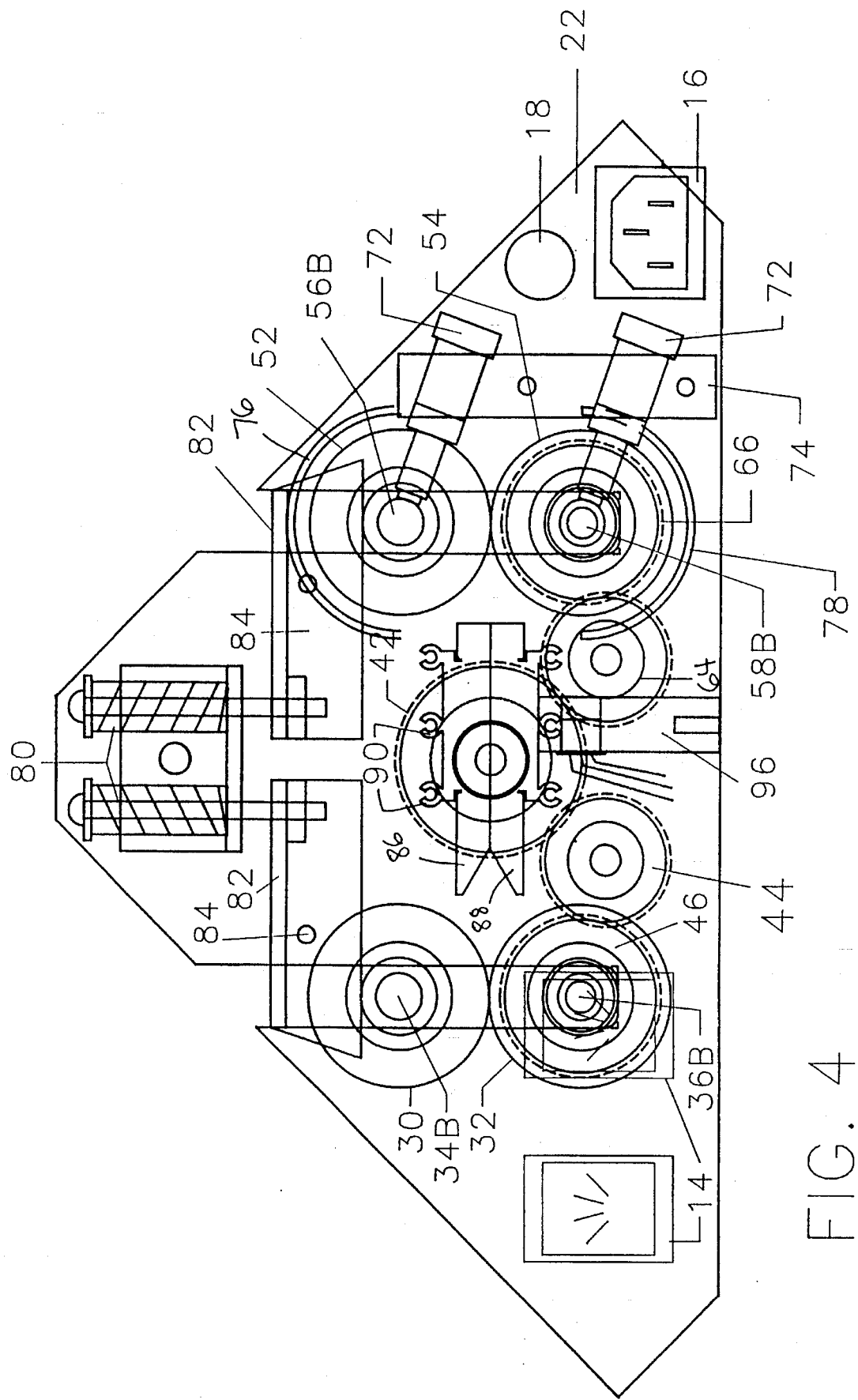
FIG. 4 is a schematic side elevation view, looking from the right side of FIG. 1.

FIGS. 1–4 illustrate a preferred form of the laminator according to the present invention. The laminator has a housing which includes a baseplate 10 having a bracket 12 at one end. The bracket mounts switches 14, a power entry module 16 and a fuse holder 18. Two upright frame members 20 and 22 are fixed to the baseplate. The baseplate also mounts a drive motor 24 near the bracket 12. A transformer 26 and a heater control circuit board 28 (FIG. 1) are located along the front side of the baseplate. This circuit board contains circuitry for controlling the temperature of the expeller rollers as will be explained below.

Upper and lower feed rollers 30 and 32 are mounted on shafts 34A, 34B and 36A, 36B which are in turn rotatably supported in bearings 38A, 38B and 40A, 40B. These bearings are attached to the frame members 20 and 22. The drive motor 24 has a gear 42. The lower feed roller 32 is driven by gear 42, through pinion 44, which is mounted on plate 22, and gear 46, which is fixed to the shaft 34B. The opposite ends of the feed rollers have gears 48 and 50 on shafts 34A and 36A, respectively. Gears 48 and 50 drive the upper feed roller 30.

Upper and lower expeller rollers 52 and 54 are mounted on shafts 56A, 56B and 58A, 56B which are rotatably supported in bearings, which are shown for the upper shafts at 60A, 60B. These bearings are attached to the frame members 20 and 22. The lower expeller roller 54 is driven by gear 42, through pinion 64 and gear 66, which is fixed to the shaft 56B. The opposite ends of the feed rollers have gears 68 and 70 on shafts 56A, 58A, respectively. Gears 68 and 70 drive the upper expeller roller 52.

A brush is associated with each end of the expeller roller shafts. The brushes supply electric power to the expeller rollers for heating them. The brushes are shown at 72, mounted on brackets 74. While brushes are shown, it will be understood that other methods of connecting an electric power supply to the expeller rollers could be used for the purpose of heating the expeller rollers. Upper and lower roller heat shields are shown at 76 and 78 in FIGS. 3 and 4.

Both the upper feed roller and upper expeller roller are spring-biased toward their respective lower rollers. This is done by pressure springs shown at 80 in FIG. 4. The springs act on levers 82 which are pivotably attached to the frame member 22 by pins 84.

A preheater is located between the feed rollers and the expeller rollers. In the embodiment shown the preheater comprises cooperating upper and lower flat platens 86 and 88. The platens are suspended between the frame members by screws (not shown) which engage clips 90 at the edges of the platens. Each platen has its own thermostat 92, 94, to control platen temperature. It will be noted that the mating line of the platens is aligned with the nip of both the feed rollers and the expeller rollers. Also, the platens define a V-shaped notch on the side adjacent the feed rollers.

Beneath the platens is a bracket 96 which mounts an infrared sensor 98. This may be used to monitor the temperature of the expeller rollers. It will be understood that other types of temperature sensors could be used, either of the contacting or non-contacting type.

The use, operation and function of the laminator are as follows. Electric power is supplied to both the flat platens 86, 88 and the expeller rollers 52, 54, under control of the circuit board 28 and the thermostats 92, 94. The drive motor 24 rotates both the cold feed rollers 30, 32 and the hot expeller rollers. The feed rate and temperatures are coordinated so that sufficient dwell time is provided to melt the adhesive of a workpiece at the expeller rollers.

The workpiece comprises an insert or substrate and surrounding layers of plastic film having an adhesive on the side toward the insert. The workpiece is fed into the nip of the feed rollers 30, 32, which grab the workpiece and advance it into and through the flat platens 86, 88. The flat platens are at a temperature that will elevate the temperature of the workpiece toward the melting point of the adhesive without ever reaching the melting point. Preferably the platens themselves are below the melting point but alternatively a platen temperature above the melting point could be used in conjunction with a high feed rate (and therefore a low dwell time in the platens). The important point is that a platen temperature and feed rate combination is chosen which results in sufficient heat transfer to raise the adhesive's temperature but not melt it. By assuring that no melting takes place in the platens, pre-lamination and its resulting air bubbles are avoided.

The workpiece with heated, but not melted, adhesive advances from the flat platens to the expeller rollers 52, 54. The control circuit 28 maintains the expeller rollers at a temperature above the adhesive's melting point. When the workpiece moves into the nip of the expeller rollers, the preheated adhesive quickly melts. The pressure of the rollers squeezes the film layers together and expresses any air between the layers of film.

It has been found that a laminator of the above construction is able to process any substrate without forming bubbles. Throughput of the machine is as great or greater than machines which cannot produce bubble free lamination and rely on platen heat alone.

It will be understood that various temperature and motor control schemes are possible. Motor speed is adjustable to optimize the quality of the process. Any suitable method of platen and roller heating could be used, such as conductive resin, internal heat lamp, resistance wires, internal cartridge heater, external heat lamps, or a blanket heater. Temperature control can be done by a thermostat, thermistor, thermocouple, platinum RTD or non-contact means such as the infrared sensor shown.

While a preferred form of the invention has been shown and described, it will be realized that alterations could be made thereto without departing from the scope of the following claims. For example, it may be desirable in some applications to provide an optional third set of cold expeller rollers downstream of the heated expeller rollers.

I claim:

1. In a laminating machine for laminating a workpiece which includes a substrate between discrete layers of plastic film having a meltable adhesive on at least one side thereof, the machine having a frame, and expeller rollers mounted on the frame for feeding the workpiece through the machine, a method of eliminating entrapped air bubbles while laminating the workpiece to form a pouch, comprising the steps of:

forming an unlaminated workpiece by placing the discrete layers of plastic film adjacent one another with the substrate between the layers;

feeding the unlaminated workpiece to the laminating machine;

preheating the unlaminated layers of the workpiece while they are adjacent one another to an elevated temperature below the melting temperature of the adhesive prior to entering the expeller rollers;

maintaining the expeller rollers at a temperature above the melting point of the adhesive, and passing the workpiece through the expeller rollers to simultaneously apply heat and pressure to the workpiece, the heat being sufficient to melt the adhesive and the pressure being sufficient to laminate the workpiece and the pressure being concentrated in an area smaller than the entire area of the workpiece to squeeze any entrapped air out of the workpiece.

2. The method of claim 1 further characterized in that the preheating step is carried out bypassing the workpiece through a pair of flat platens whose temperature is maintained below the melting point of the adhesive.

\* \* \* \* \*